(12) United States Patent
Hrabak (10) Patent No.: US 9,393,918 B2
(45) Date of Patent: Jul. 19, 2016

(54) METHODS, SYSTEMS AND APPARATUS FOR PROVIDING APPLICATION GENERATED INFORMATION FOR PRESENTATION AT AN AUTOMOTIVE HEAD UNIT

(71) Applicant: GM GLOBAL TECHNOLOGY OPERATIONS LLC, Detroit, MI (US)

(72) Inventor: Robert A. Hrabak, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 285 days.

(21) Appl. No.: 13/951,599

(22) Filed: Jul. 26, 2013

(65) Prior Publication Data

US 2015/0032800 A1    Jan. 29, 2015

(51) Int. Cl.
| | | |
|---|---|---|
| *B60R 16/023* | (2006.01) | |
| *H04L 29/08* | (2006.01) | |
| *H04L 29/06* | (2006.01) | |

(52) U.S. Cl.
CPC ............ *B60R 16/0231* (2013.01); *H04L 67/12* (2013.01); *H04L 67/42* (2013.01)

(58) Field of Classification Search
CPC ........... H04L 7/00; H04L 51/00; H04L 51/02; H04L 51/10; H04L 51/38; H04L 65/00; H04L 65/40; H04L 67/00; H04L 67/02; H04L 67/08; H04L 67/10; H04L 67/1095; H04L 67/12; H04L 67/125; H04L 67/16; H04L 67/28; H04L 67/2838; H04L 67/2861; H04L 67/2866; H04L 61/2866; H04L 67/2885; H04L 67/289; H04M 1/00; H04M 11/00; H04M 11/002; H04M 11/007; H04M 11/08; G06F 3/00; G06F 3/01; G06F 3/016; G06F 3/02; G06F 3/14; G06F 3/16; G06F 3/167; G06F 9/00; G06F 13/00; G06F 13/10; G06F 13/107; G06F 13/12; G06F 13/128; G06F 13/38; G06F 13/42; G06F 15/00; G06F 15/16; G06F 15/17; G06F 15/173; B60R 16/00; B60R 16/02; B60R 16/023–16/0232; B60R 2300/00; B60R 2300/20; B60R 2300/205
See application file for complete search history.

(56) References Cited

U.S. PATENT DOCUMENTS 6,246,985 B1 *  6/2001  Kanevsky et al. ............ 704/270
6,421,607 B1 *  7/2002  Gee et al. ...................... 701/420

(Continued)

OTHER PUBLICATIONS

Nokia Car Mode drives fusion of cars with smartphone services—Sep. 13, 2011—Nokia.*

(Continued)

*Primary Examiner* — Brian J Gillis
*Assistant Examiner* — Boris Grijalva Lobos
(74) *Attorney, Agent, or Firm* — Ingrassia Fisher & Lorenz, P.C.

(57) ABSTRACT

Vehicles, computer-implemented methods, systems and apparatus are disclosed for providing application generated information for presentation at an automotive head unit (AHU) of a vehicle. For example, a vehicle is provided that is configured to communicate with an application server. The application server hosts and executes an application to generate information. The application server provides a first part of a MirrorLink server since the application hosted at the application server is normally hosted at and designed to be executed by a consumer electronics device to generate the information, and the information is normally presented at the consumer electronics device. The vehicle includes a network access device (NAD) integrated within the vehicle and an AHU that communicatively coupled to the NAD. The AHU includes a human-machine-interface (HMI). The NAD includes a wireless communication interface that serves as a second part of the MirrorLink server. For example, the wireless communication interface can receive the information over a wireless communication link and provide the information to the HMI where the information can then be presented on the HMI.

15 Claims, 4 Drawing Sheets

(56) References Cited

U.S. PATENT DOCUMENTS

| | | | | |
|---|---|---|---|---|
| 7,966,111 | B2* | 6/2011 | Moinzadeh et al. | 701/29.6 |
| 8,195,203 | B1* | 6/2012 | Tseng | 455/457 |
| 8,533,796 | B1* | 9/2013 | Shenoy et al. | 726/6 |
| 8,694,203 | B2* | 4/2014 | Chen et al. | 701/36 |
| 8,744,412 | B1* | 6/2014 | Cazanas et al. | 455/412.1 |
| 8,843,122 | B1* | 9/2014 | Wick et al. | 455/418 |
| 8,918,091 | B1* | 12/2014 | Hoelzle et al. | 455/418 |
| 9,055,022 | B2* | 6/2015 | Ricci | |
| 2005/0132024 | A1* | 6/2005 | Habaguchi et al. | 709/219 |
| 2009/0088153 | A1* | 4/2009 | Krause et al. | 455/433 |
| 2009/0144622 | A1* | 6/2009 | Evans et al. | 715/706 |
| 2010/0125387 | A1* | 5/2010 | Sehyun et al. | 701/36 |
| 2010/0280956 | A1* | 11/2010 | Chutorash et al. | 705/64 |
| 2011/0173589 | A1* | 7/2011 | Guttman et al. | 717/125 |
| 2011/0196571 | A1* | 8/2011 | Foladare et al. | 701/33 |
| 2011/0225259 | A1* | 9/2011 | Quinn et al. | 709/217 |
| 2011/0289186 | A1* | 11/2011 | Bell et al. | 709/217 |
| 2012/0198080 | A1* | 8/2012 | Yang | H04L 61/2015 709/227 |
| 2012/0253823 | A1* | 10/2012 | Schalk et al. | 704/270.1 |
| 2013/0089006 | A1* | 4/2013 | Huang et al. | 370/259 |
| 2013/0102295 | A1* | 4/2013 | Burke et al. | 455/414.4 |
| 2013/0151064 | A1* | 6/2013 | Becker et al. | 701/31.4 |
| 2013/0176231 | A1* | 7/2013 | Chen | 345/173 |
| 2013/0244634 | A1* | 9/2013 | Garrett et al. | 455/418 |
| 2013/0274997 | A1* | 10/2013 | Chien | 701/36 |
| 2014/0026057 | A1* | 1/2014 | Kimpton et al. | 715/733 |
| 2014/0043141 | A1* | 2/2014 | Cazanas et al. | 340/5.81 |
| 2014/0066014 | A1* | 3/2014 | Nicholson | H04W 12/08 455/411 |
| 2014/0068010 | A1* | 3/2014 | Nicholson et al. | 709/219 |
| 2014/0068713 | A1* | 3/2014 | Nicholson et al. | 726/3 |
| 2014/0106726 | A1* | 4/2014 | Crosbie et al. | 455/418 |

OTHER PUBLICATIONS

Definition of Application—American Heritage Dictionary—Fifth Ed—2011.*
Definition of Application—Dictionary of Unfamiliar Words—Diagram Group—2008.*
Definition of Application—pcmag.com—May 8 2013.*
Definition of Application—webopedia.com—Jul. 19, 2013.*
Beckmann, M. et al., "Car Connectivity Consortium MirrorLink™", Connectivity, Version 1.1 (CCC-TS-008), Copyright © 2011-2012 Car Connectivity Consortium LLC.
Battistutti, G. et al., "Car Connectivity Consortium MirrorLink™", Connectivity Test Specification, Version 1.1 (CCC-TS-009), Copyright © 2011-2012 Car Connectivity Consortium LLC.
Beckmann, M. et al., "Car Connectivity Consortium MirrorLink™", VNC based Display and Control, Version 1.1 (CCC-TS-010), Copyright © 2011-2012 Car Connectivity Consortium LLC.
Brakensiek, J. et al., "Car Connectivity Consortium MirrorLink™", VNC based Display and Control Test Specification, Version 1.1 (CCC-TS-011), Copyright © 2011-2012 Car Connectivity Consortium LLC.
Beckmann, M. et al., "Car Connectivity Consortium MirrorLink™", Audio, Version 1.1 (CCC-TS-012), Copyright © 2011-2012 Car Connectivity Consortium LLC.
Beckmann, M. et al., "Car Connectivity Consortium MirrorLink™", Device Attestation Protocol, Version 1.1 (CCC-TS-014), Copyright © 2011-2012 Car Connectivity Consortium LLC.
Brakensiek, J. et al., "Car Connectivity Consortium MirrorLink™", Audio Test Specification, Version 1.1 (CCC-TS-013), Copyright © 2011-2012 Car Connectivity Consortium LLC.
Brakensiek, J. et al., "Car Connectivity Consortium MirrorLink™", Device Attestation Protocol Test Specification, Version 1.1 (CCC-TS-015), Copyright © 2011-2012 Car Connectivity Consortium LLC.
Bose, R. et al., "Car Connectivity Consortium MirrorLink™", Common Data Bus, Version 1.1 (CCC-TS-016), Copyright © 2011-2012 Car Connectivity Consortium LLC.
Brakensiek, J. et al., "Car Connectivity Consortium MirrorLink™", Common Data Bus Test Specification, Version 1.1 (CCC-TS-017), Copyright © 2011-2012 Car Connectivity Consortium LLC.
Park, K. et al., "Car Connectivity Consortium MirrorLink™", Service Binary Protocol, Version 1.1 (CCC-TS-018), Copyright © 2011-2012 Car Connectivity Consortium LLC.
Hrabak, R. et al., "Car Connectivity Consortium MirrorLink™", Service Binary Protocol Test Specification, Version 1.1 (CCC-TS-019), Copyright © 2011-2012 Car Connectivity Consortium LLC.
Park, K. et al., "Car Connectivity Consortium MirrorLink™", GPS Data Service, Version 1.1 (CCC-TS-020), Copyright © 2011-2012 Car Connectivity Consortium LLC.
Park, K. et al., "Car Connectivity Consortium MirrorLink™", GPS Data Service Test Specification, Version 1.1 (CCC-TS-021), Copyright © 2011-2012 Car Connectivity Consortium LLC.
Park, K. et al., "Car Connectivity Consortium MirrorLink™", Location Data Service, Version 1.1 (CCC-TS-022), Copyright © 2011-2012 Car Connectivity Consortium LLC.
Park, K. et al., "Car Connectivity Consortium MirrorLink™", Location Data Service Test Specification, Version 1.1 (CCC-TS-023), Copyright © 2011-2012 Car Connectivity Consortium LLC.
Benesch, M. et al. "Car Connectivity Consortium MirrorLink™", UPnP Application Server Service, Version 1.1 (CCC-TS-024), Copyright © 2011-2012 Car Connectivity Consortium LLC.
Brakensiek, J. et al., "Car Connectivity Consortium MirrorLink™", UPnP Application Server Service Test Specification, Version 1.1 (CCC-TS-025), Copyright © 2011-2012 Car Connectivity Consortium LLC.
Bose, R. et al., "Car Connectivity Consortium MirrorLink™", UPnP Client Profile Service, Version 1.1 (CCC-TS-026), Copyright © 2011-2012 Car Connectivity Consortium LLC.
Brakensiek, J. et al., "Car Connectivity Consortium MirrorLink™", UPnP Client Profile Service Test Specification, Version 1.1 (CCC-TS-027), Copyright © 2011-2012 Car Connectivity Consortium LLC.
Benesch, M. et al., "Car Connectivity Consortium MirrorLink™", UPnP Notification Server Service, Version 1.1 (CCC-TS-028), Copyright © 2011-2012 Car Connectivity Consortium LLC.
Brakensiek, J. et al, "Car Connectivity Consortium MirrorLink™", UPnP Notification Server Service Test Specification, Version 1.1 (CCC-TS-029), Copyright © 2011-2012 Car Connectivity Consortium LLC.
Bose, R. et al., "Car Connectivity Consortium MirrorLink™", UPnP Server Device, Version 1.1 (CCC-TS-030), Copyright © 2011-2012 Car Connectivity Consortium LLC.
Brakensiek, J. et al., "Car Connectivity Consortium MirrorLink™", UPnP Server Device Test Specification, Version 1.1 (CCC-TS-031), Copyright © 2011-2012 Car Connectivity Consortium LLC.
Brakensiek, J. et al., "Car Connectivity Consortium MirrorLink™", Core Architecture, Version 1.1 (CCC-TS-032), Copyright © 2011-2012 Car Connectivity Consortium LLC.
Brakensiek, J. et al., "Car Connectivity Consortium MirrorLink™", Interoperability Test Specification, Version 1.1 (CCC-TS-033), Copyright © 2011-2012 Car Connectivity Consortium LLC.

* cited by examiner

METHODS, SYSTEMS AND APPARATUS FOR PROVIDING APPLICATION GENERATED INFORMATION FOR PRESENTATION AT AN AUTOMOTIVE HEAD UNIT

TECHNICAL FIELD

The technical field generally relates to vehicle communications, and more particularly relates to methods, systems and apparatus for providing application generated information for presentation at an automotive head unit (AHU) of a vehicle.

BACKGROUND

Many vehicles today include onboard computers that perform a variety of functions. For example, onboard computers control operation of the engine, control systems within the vehicle, provide security functions, perform diagnostic checks, provide information and entertainment services to the vehicle, perform navigation tasks, and facilitate communications with other vehicles and remote driver-assistance centers. Telematics service systems, for example, provide services including in-vehicle safety and security, hands-free calling, turn-by-turn navigation, and remote-diagnostics.

On-board computers also facilitate delivery to the driver of information and entertainment, which are sometimes referred to collectively as infotainment. Infotainment can include, for example, data related to news, weather, sports, music, and notifications about vehicle location and nearby traffic. Infotainment can be delivered in any of a wide variety of forms, including text, video, audio, and combinations of these.

Mobile devices, such as smartphones, have given consumers access to a growing number of applications anytime anywhere. However, these applications are of limited use while driving, and even the most advanced car infotainment systems cannot match functionality offered by most smartphone applications.

Recently, a group known as the Car Connectivity Consortium has been developing standard specifications referred to as MirrorLink™ (or also referred to herein simply as MirrorLink) that govern smartphone-automotive interoperability. A goal of MirrorLink technology is to provide a standard for interoperability of smartphones with in-vehicle infotainment (IVI) systems. MirrorLink specifies protocols that allows devices (e.g., such as smartphones) to communicate with in-vehicle computer systems. One specific goal of MirrorLink is to provide a system that can be used to communicate display content generated by an application running on a smartphone, and replicate the display content from the smartphone onto display located within a vehicle so that the content appears on the display and is more easily viewed by the user. MirrorLink (previously known as Terminal Mode) provides mechanisms for seamless connectivity between a smartphone and a vehicle's infotainment system. The consumer merely gets into the car, connects their smartphone to the infotainment system (e.g., with a cable or Bluetooth link), and immediately gains access to phone applications through car controls such as the navigation screen and steering wheel buttons. MirrorLink is designed to enable a driver to control a nearby smartphone from the steering wheel or via dashboard buttons and screens. This allows consumers to access their smartphone in the same way they access their car radio, while keeping their eyes on the road and hands on the wheel. In short, MirrorLink technology will provide a way to transform mobile devices (e.g., mobile wireless communication devices such as cellular telephones also referred to as "smartphones") into automotive application platforms thereby bringing in the mobile application ecosystem into the vehicle so that robust mobile applications can be leveraged in vehicle infotainment systems.

One drawback of the systems that are described above is that they require a smartphone (or other consumer electronics device) that is capable of acting as a "MirrorLink" server to the infotainment system.

Accordingly, it is desirable to provide alternative methods and systems for implementing MirrorLink server type functionality without requiring a special consumer electronics device to be present within the vehicle. It would also be desirable to provide alternative methods and systems for executing applications, which would otherwise traditionally be executed at a consumer electronics device, to provide content that can be presented via a user interface within the vehicle. Furthermore, other desirable features and characteristics of the present invention will become apparent from the subsequent detailed description and the appended claims, taken in conjunction with the accompanying drawings and the foregoing technical field and background.

SUMMARY

In one embodiment, a system is provided that comprises a communication system is provided that includes an application server, a network coupled to the application server via a first network link, communication infrastructure that is coupled to the network via a second network link, and a vehicle. The application server hosts an application that when executed generates information, and communicates the information over the network to the communication infrastructure. The vehicle includes a network access device (NAD) integrated within the vehicle, and an automotive head unit (AHU) that is communicatively coupled to the NAD via a link. The NAD includes a wireless communication interface configured to receive the information from the communication infrastructure via a wireless communication link. The AHU includes a human-machine-interface (HMI) configured to present the information within the vehicle.

In another embodiment, a computer-implemented method is provided a computer-implemented method is provided for providing information for presentation at a human-machine-interface (HMI) of an automotive head unit (AHU) of a vehicle. The computer-implemented method comprises executing, at an application server, an application to generate information; communicating the information from the application server over a network to communication infrastructure; communicating the information from the communication infrastructure via a wireless communication link to a wireless communication interface of a network access device (NAD) that is integrated within a vehicle; communicating the information from the NAD to the AHU of the vehicle over a link; and presenting the information at the HMI of the AHU.

In another embodiment, a vehicle is provided that is configured to communicate with an application server. The application server hosts and executes an application to generate information. In this embodiment, the application server provides a first part of a MirrorLink server since the application hosted at the application server is normally hosted at and designed to be executed by a consumer electronics device to generate the information, and the information is normally presented at the consumer electronics device. The vehicle includes a network access device (NAD) integrated within the vehicle and an automotive head unit (AHU) that communicatively coupled to the NAD. The AHU includes a human-machine-interface (HMI). The NAD includes a wireless communication interface that serves as a second part of the MirrorLink server. For example, the wireless communication interface can receive the information over a wireless communication link and provide the information to the HMI where the information can then be presented on the HMI.

DESCRIPTION OF THE DRAWINGS

The exemplary embodiments will hereinafter be described in conjunction with the following drawing figures, wherein like numerals denote like elements, and wherein.

DETAILED DESCRIPTION

Various embodiments of the present disclosure are disclosed herein. The disclosed embodiments are merely examples that may be embodied in various and alternative forms, and combinations thereof. The following detailed description is merely exemplary in nature and is not intended to limit the application and uses. The word "exemplary" is used exclusively herein to mean "serving as an example, instance, or illustration." Any embodiment described herein as "exemplary" is not necessarily to be construed as preferred or advantageous over other embodiments. As used herein, for example, "exemplary" and similar terms, refer expansively to embodiments that serve as an illustration, specimen, model or pattern. Furthermore, there is no intention to be bound by any expressed or implied theory presented in the preceding technical field, background, brief summary or the following detailed description.

Overview

Before describing some of the disclosed embodiments, it should be observed that the disclosed embodiments generally relate to systems, methods, computer-readable media, computer-executable instructions, and apparatus for providing application generated information for presentation at a human-machine-interface (HMI) of an automotive head unit (AHU) of a vehicle. Thus, the systems, in various embodiments, include vehicles, such as automobiles, and onboard computer sub-systems thereof, and in some embodiments also include one or more remote servers.

Figure 1:
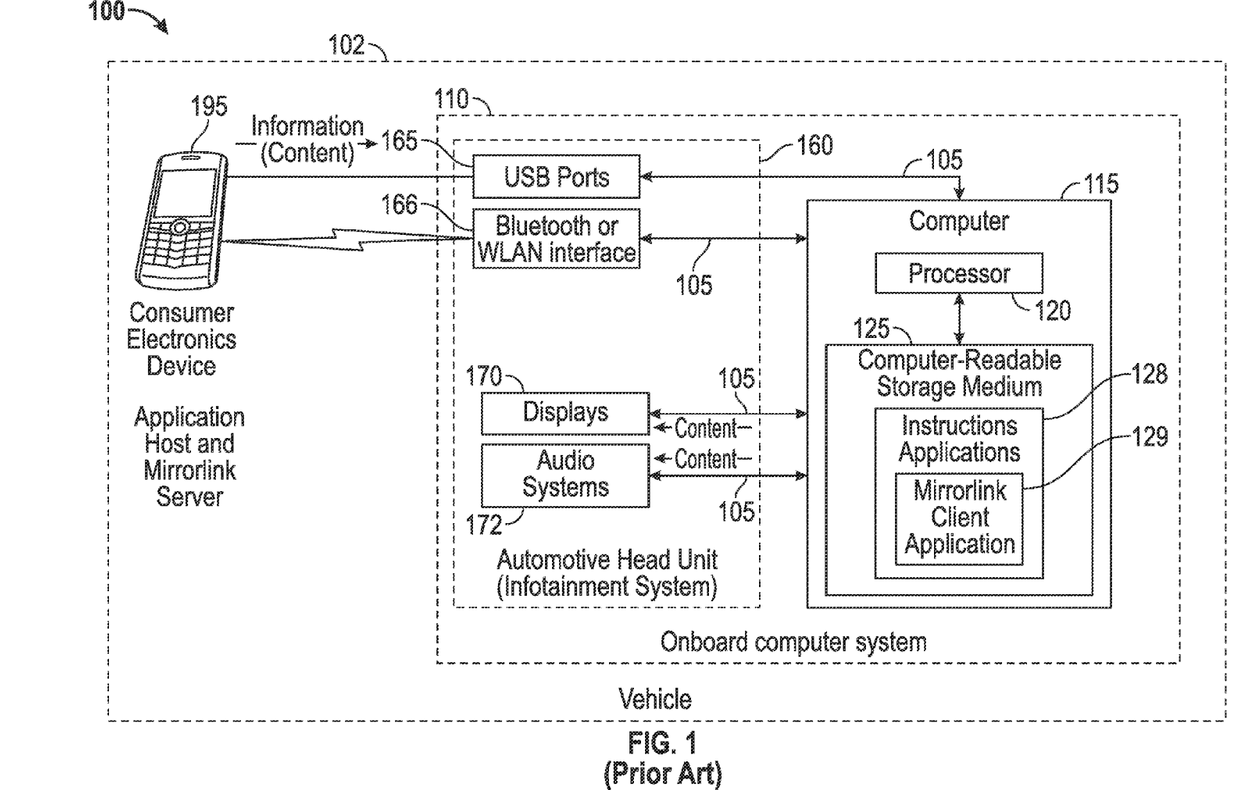
FIG. 1 is a diagram that illustrates a conventional terminal mode system that includes a consumer electronics device and an automotive head unit (AHU) of vehicle.

FIG. 1 is a diagram that illustrates a conventional terminal mode system 100 that includes a consumer electronics device 195 and a vehicle 102 that includes an onboard computer system 110 that includes an automotive head unit (AHU) 160 with various components 115, 170, 172 of an in-vehicle infotainment system. The vehicle can be, for example, an automotive vehicle or automobile.

The consumer electronics device 195 (referred to below simply as a device 195) can be any type of electronics device that includes elements such as a transceiver, computer readable medium, processor, and a display. In this example, the consumer electronics device 195 is illustrated as being a portable wireless communication device 195 located in the vehicle 102. The device 195 can be, for example, any number of different portable wireless communications devices, such as personal or tablet computers, cellular telephones, smart phones, etc. The portable wireless communication device 195 is not part of the vehicle, but is illustrated in FIG. 1 since it can be communicatively coupled to the automotive head unit 160. As will be described below, the device 195 can be communicatively coupled to various components of an onboard computer system 110 via a wireless or wired connection.

The onboard computer system 110 includes a computer 115 and the AHU 160. The computer 115 and the AHU 160 are coupled to each other via one or more in-vehicle buses 105 that are illustrated in FIG. 1 by one or more bus line(s) 105. As used herein, the bus 105 can include any internal vehicle bus. The bus 105 includes various wired paths that are used to interconnect the various systems and route information between and among the illustrated blocks of FIG. 1.

The AHU 160 is used to provide passengers in the vehicle with information and/or entertainment in various forms including, for example, music, news, reports, navigation, weather, and the like, received by way of radio systems, Internet radio, podcast, compact disc, digital video disc, other portable storage device, video on demand, and the like.

The AHU 160 includes ports 165 (e.g., USB ports), one or more Bluetooth/Wireless Local Area Network (WLAN) interface(s) 166, one or more display(s) 170, and one or more audio system(s) 172. The ports 165 and Bluetooth/WLAN interface 166 allow for external computing devices (including portable wireless communication device 195) to connect to the onboard computer system 110 and the AHU 160. The ports 165 and interfaces 166 can include ports that comply with a USB standard, and/or interfaces that comply with a Bluetooth/WLAN system. This way, the 195 can directly communicate (transmit and receive) information with the onboard computer system 110.

The onboard computer system 110 can include, or can be connected to, a computer 115, and an AHU 160 that embodies components of an infotainment system. It is noted that although certain blocks are indicated as being implemented with the onboard computer system 110, in other embodiments, any of these modules can be implemented outside the onboard computer system 110. The computer 115 includes at least one computer processor 120 that is in communication with a tangible, non-transitory computer-readable storage medium 125 (e.g., computer memory) by way of a communication bus 105 or other such computing infrastructure. The computer-readable storage medium 125 stores instructions 128 that can be loaded at the processor 120 and executed to generate information that can be communicated to the AHU 160. These instructions 128 include a MirrorLink client application 129 that can be loaded at the processor 120 and executed. The MirrorLink client application 129 receives and processes information provided from one or more applications that are being executed at the device 195.

The consumer electronics device 195 is an application host that runs an installed application locally and renders content on a display of the device 195. In a conventional terminal mode system 100, information input or generated by applications at the device 195 (that is presently in the vehicle) can be communicatively coupled as data packets (e.g., as IP packets) via a USB connection 165 or Bluetooth/WLAN link 166 to the onboard computer system 110, where the information can be processed by a MirrorLink client application 129 and provided to any other component of an infotainment system in the vehicle 102. This way content rendered by applications at the device 195 can be replicated at the AHU 160 such that content that would normally appear on the display (not illustrated) of the consumer electronics device can be rendered on a display 170 of the vehicle 102, and such that audio content produced at the consumer electronics device 195 can be played back via audio systems 172 of the vehicle 102. For example, information generated by applications running on the device 195 can be communicated to and output at the displays 170 and/or audio systems 172 that are part of the AHU 160. It is noted that the information is not limited to being display or audio information. It can also be (or can include) control information, voice information, user input or output information, etc. that is generated by applications that are running on the device 195. In one non-limiting example when the information is display information, for example, the display information can be communicatively coupled via a USB connection 165 or Bluetooth/WLAN link 166 to the displays 170 and replicated on those displays 170. This allows the displays 170 in the vehicle 102 to "mirror" the display at the consumer electronics device 195.

Thus, in accordance with MirrorLink standards, the device 195 acts as what is commonly referred to as a MirrorLink server, whereas the AHU 160 is commonly referred to as a MirrorLink client. As used herein, the term "MirrorLink server" refers to a server that is compliant with the Mirror-Link 1.0 device specification, and a MirrorLink client refers to a client that is compliant with the MirrorLink 1.0 device specification. Copies of the MirrorLink 1.0 device specification can be obtained online from the Car Connectivity Consortium (CCC), or by mail by at the CCC Administration, 3855 SW 153rd Drive, Beaverton, Oreg. 97006. The Mirror-Link 1.0 device specification, which is incorporated by reference herein in its entirety, was first published for public availability on Feb. 11, 2013.

In particular, the device 195 functions as a host server for applications and any content produced by those applications at the device can be communicated as data packets to the onboard computer system.

A conventional terminal mode system 100 required a device 195 be compatible with the MirrorLink standards so that a MirrorLink server is available to serve information to the MirrorLink client application 129 that runs at processor 115. Without a compatible device 195, there is no existing way to replicate application generated information or content at the displays 170 and audio systems 172 of the vehicles 102.

It would be desirable to provide a solution that allows the need for a consumer electronics device 195 to be eliminated. In accordance with the disclosed embodiments, a new implementation of a MirrorLink server is provided as will be described below with reference to FIGS. 2 and 3.

Figure 2:
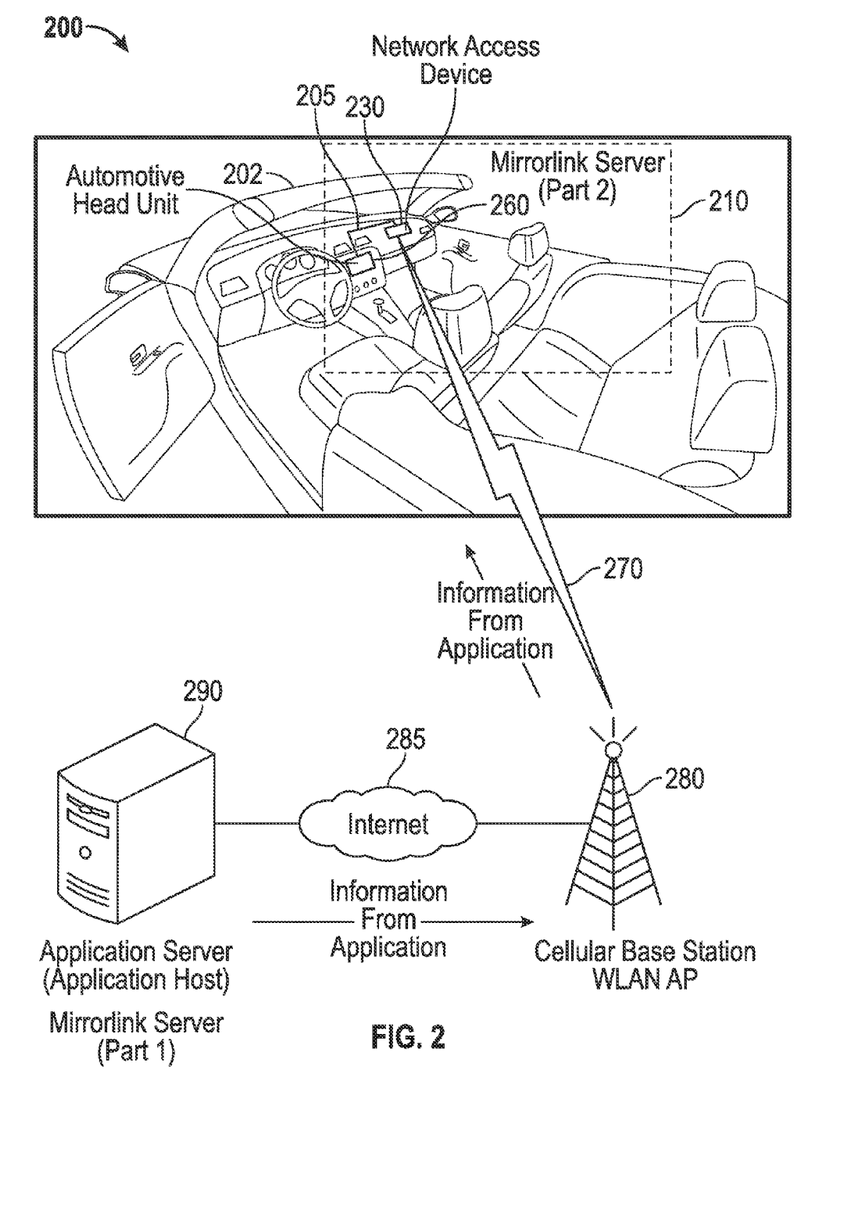
FIG. 2 is a diagram that illustrates a communication system that includes a vehicle and an application server in accordance with some of the disclosed embodiments.

FIG. 2 is a diagram that illustrates a communication system 200 that includes a vehicle 202 and an application server 290 in accordance with some of the disclosed embodiments. The communication system 200 may also include, in some implementations, communication infrastructure 280 that is coupled to the application server 290 by a network 285, such as, the Internet.

The vehicle 202 includes an onboard computer system 210. In an embodiment, the system 210 includes an embedded network access device (NAD) 230 and an automotive head unit (AHU) 260. The NAD 230 and AHU 260 are communicatively coupled via a bus 205. An example implementation of the onboard computer system 210 will be described below with reference to FIG. 3, and as will be described with reference to FIG. 3, the AHU 260 includes various infotainment system components that are not illustrated in FIG. 2 for sake of clarity. Further, it is noted that although the NAD 230 and AHU 260 are illustrated as separate blocks that are coupled via the bus 205, in other embodiments, the NAD 230 can be part of the AHU 260.

The NAD 230 is embedded and/or integrated into the vehicle 210. The NAD 230 can include at least one communication interface, and in many cases, a plurality of communication interfaces. The NAD 230 allows the vehicle 202 to communicate information over-the-air using one or more wireless communication links 270. The physical layer used to implement these wireless communication links can be implemented using any known or later-developed wireless communication or radio technology. In some embodiments, the wireless communication links can be implemented, for example, using one or more of Dedicated Short-Range Communications (DSRC) technologies, cellular radio technology, satellite-based technology, wireless local area networking (WLAN) or WI-FI® technologies such as those specified in the IEEE 802.x standards (e.g. IEEE 802.11 or IEEE 802.16), WIMAX®, BLUETOOTH®, near field communications (NFC), the like, or improvements thereof (WI-FI is a registered trademark of WI-FI Alliance, of Austin, Tex.; WIMAX is a registered trademark of WiMAX Forum, of San Diego, Calif.; BLUETOOTH is a registered trademark of Bluetooth SIG, Inc., of Bellevue, Wash.).

The communication infrastructure 280 allows the NAD 230 to communicate with the remotely located application server 290 over wireless communication link(s) 270. Communication infrastructure 280 can generally be any public or private access point that provides an entry/exit point for the embedded NAD 230 (within the vehicle 202) to communicate with an external communication network 285 over wireless communication link(s). Communications that utilize communication infrastructure 280 are sometimes referred to colloquially as vehicle-to-infrastructure, or V2I, communications. Depending on the implementation, the communication infrastructure 280 can be a cellular base station, a WLAN access point, a satellite, etc. that is in communication with server 290. The communication infrastructure 280 can include, for example, long-range communication nodes (e.g., cellular base stations 280 or communication satellites 280) and shorter-range communication nodes (e.g., WLAN access points 280) that are communicatively connected to the communication network 285. Communications between NAD 230 and shorter-range communication nodes are typically facilitated using IEEE 802.x or Wi-Fi®, Bluetooth®, or related or similar standards. Shorter-range communication nodes can be located, for example, in homes, public accommodations (coffee shops, libraries, etc.), and as road-side infrastructure such as by being mounted adjacent a highway or on a building in a crowded urban area.

The communication network 285 can include a wide area network, such as one or more of a cellular telephone network, the Internet, Voice over Internet Protocol (VoIP) networks, local area networks (LANs), wide area networks (WANs), personal area networks (PANs), and other communication networks.

Communications from the embedded NAD 230 of the vehicle 202 to the remote server 290, and from the remote server 290 to the embedded NAD 230, can traverse through the communication network 285. The NAD 230 allows the vehicle 202 to communicate with the server 290 so that they can communicate with each other to share information, such as packetized data and voice data. In addition, the NAD 230 can include communication interfaces that allow for short-range communications with other vehicles (not illustrated) (e.g., that allow the vehicle 202 to communicate directly with one or more other vehicles as part of an ad-hoc network without relying on intervening infrastructure, such as node 280). Such communications are sometimes referred to as vehicle-to-vehicle (V2V) communications. The DSRC standards, for instance, facilitate wireless communication channels specifically designed for automotive vehicles so that participating vehicles can wirelessly communicate directly on a peer-to-peer basis with any other participating vehicle.

In accordance with the disclosed embodiments, the remotely-located application server 290 and the network access device 230 together provide or serve as a MirrorLink server. The application server 290 provides or serves as the first part of the MirrorLink server, and the network access device 230 provides or serves as the second part of the MirrorLink server. As will be explained in greater detail below, the application server 290 hosts and executes an application to generate information. The application server 290 provides a first part of a MirrorLink server since the application hosted at the application server 290 is normally hosted at and designed to be executed by a consumer electronics device to generate the information, and the information is normally presented at the consumer electronics device. The network access device 230 serves as a second part of the MirrorLink server. For example, a wireless communication interface of the network access device 230 can receive the information (that was generated by the application hosted at the application server 290) over a wireless communication link and provide the information to the AHU 260 where the information can then be presented on or at one or more human machine interfaces of the AHU 260 (e.g., so that this information or content can be replicated on a display or at an audio system of the AHU 260).

The remotely-located application server 290 serves as an application host for applications that are normally executed/run at a consumer electronics device (e.g., a smartphone). The application server 290 is a backend server that includes computer hardware for implementing a virtual computer/machine at the application server 290. This virtual computer/machine can execute/run applications (that would normally be executed/run at a consumer electronics device, such as a smartphone) to render information/content. Information or content that is generated by applications that run (or are executed) at the application server 170 can then be communicated over a network 285, such as the Internet, to communication infrastructure 280. The information that is generated by applications running at the application server 290 can be any type of information that is generated by any application software that is designed to run on or execute at a consumer electronics device, such as a smartphone. In this regard, it is noted that as used herein, a smartphone refers to a mobile telephone built on a mobile operating system with more advanced computing capability and connectivity than a feature phone. In addition to digital voice service, a modern smartphone has the capability of running applications and connecting to the Internet, and can provide a user with access to a variety of additional applications and services such as text messaging, e-mail, Web browsing, still and video cameras, MP3 player and video playback, etc. Many smartphones can typically include built in applications that can provide web browser functionality that can be used display standard web pages as well as mobile-optimized sites, e-mail functionality, voice recognition, clocks/watches/timers, calculator functionality, personal digital assistant (PDA) functionality including calendar functionality and a contact database, portable media player functionality, low-end compact digital camera functionality, pocket video camera functionality, navigation functionality (cellular or GPS), etc. In addition to their built-in functions, smartphones are capable of running an ever growing list of free and paid applications that are too extensive to list comprehensively.

In general terms, the information that is generated by applications running at the application server 290 can be (or can include) information that is capable of being presented at or displayed on human user interfaces located within the vehicle 202. A few non-limiting examples of types of information that can be communicated and displayed include, but are not limited to, text or other messaging information, information from websites, alert or warning information, telematics information, entertainment information (such as audio content, music, gaming content, video content or metadata that indicates information about such content), information from location-based services, navigation data associated with the vehicle, maps, information indicating a location of the vehicle (e.g., the location could be, for instance, a geographic location, such as a state, county, city, or other region, latitude/longitude coordinates, or other geographic coordinates or indicator), etc. These are only a few non-limiting examples of the types of information that can be generated by applications running at the application server 290 and then communicated to the NAD 230 of the vehicle 202. Further, it is noted that any combination of the information described above can be displayed together depending on the particular implementation.

It is also noted that, the information can be communicated (or "pushed") from the application server 290 to the vehicle 202 automatically on a regular basis (e.g., at regular intervals or in response to an event that takes place), or can be communicated from the application server 290 in response to a request from the vehicle 202 (or "pulled" by the vehicle 202).

Communication infrastructure 280 then communicates that information or content over a wireless communication link 270 to the network access device 230 that is embedded within the vehicle. In one embodiment, the wireless communication link 270 can be, for example, a third-generation (3G) or fourth generation (4G) communication link.

The network access device 230 provides wireless connectivity to the application server 290, and serves as a protocol adapter that interfaces with a mirror link client application (not illustrated in FIG. 2) that runs/executes at a processor (not illustrated in FIG. 2) that is located in the vehicle 202. The network access device 230 receives this information or content over the wireless communication link 270, and then communicates it over another communication link 205 (e.g., a bus within the vehicle) to a processor (not illustrated in FIG. 2) at the vehicle 202. The processor at the vehicle 202 runs/executes the mirror link client application (not illustrated in FIG. 2) that provides the information/content the automotive head unit 260 of the vehicle 202 so that this information or content can be replicated on a display or at an audio system of the AHU 260.

Figure 3:
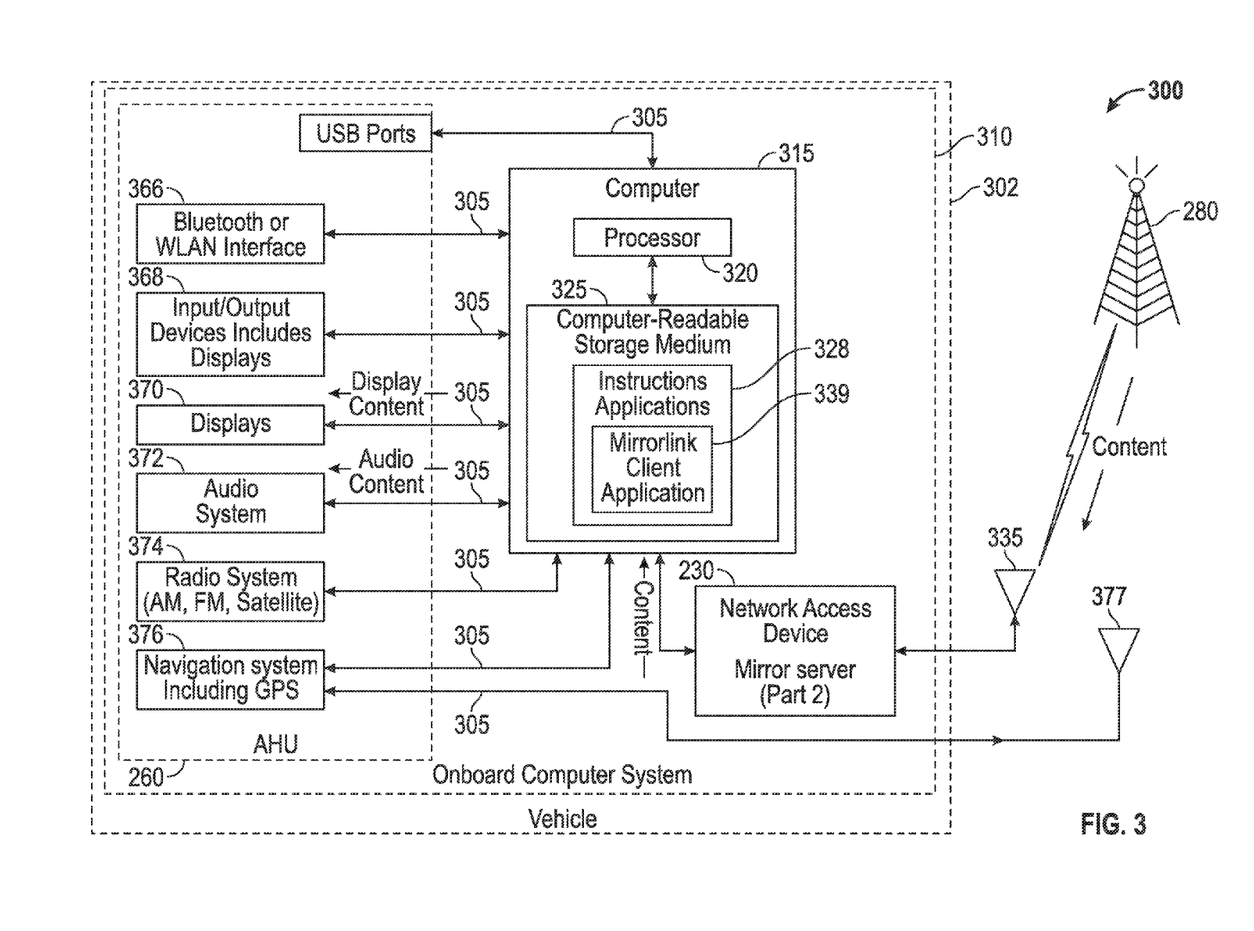
FIG. 3 is a diagram that illustrates one exemplary, non-limiting implementation of an onboard computer system of FIG. 2 in accordance with some of the disclosed embodiments.

FIG. 3 is a diagram that illustrates one exemplary, non-limiting implementation of the onboard computer system 210 of FIG. 2 in accordance with some of the disclosed embodiments. The example described in FIG. 3 is provided for sake of completeness to illustrate some of the portions of one possible embodiment of the onboard computer system 210 of FIG. 2, and will be described with reference to FIG. 2.

As mentioned above, the onboard computer system 210 includes the NAD 230 and the AHU 260. In addition, the onboard computer system 210 also includes a computer 315. The computer 315 is communicatively coupled to the NAD 230 and the AHU 260 via one or more bus line(s) 305 so that the various components of the onboard computer 310 are communicatively coupled to one another.

The computer 315 includes at least one computer processor 320 that is in communication with a tangible, non-transitory computer-readable storage medium 325 (e.g., computer memory) by way of a bus 305 or other such computing infrastructure. The processor 320 is illustrated in one block, but may include various different processors and/or integrated circuits that collectively implement any of the functionality described herein. The processor 320 includes a central processing unit (CPU) that is in communication with the computer-readable storage medium 325, and input/output (I/O) interfaces that are not necessarily illustrated in FIG. 3. In some implementations, these I/O interfaces can be implemented at I/O devices 368, displays 370, and audio systems 372 that are shown within the AHU 260. An I/O interface (not illustrated) may be any entry/exit device adapted to control and synchronize the flow of data into and out of the CPU from and to peripheral devices such as input/output devices 368.

As will be explained in greater detail below, the processor 320 can receive information from each of the other blocks illustrated in FIG. 3, process this information, and generate communications signals that convey selected information to any of the other blocks including any human machine interface in the vehicle including the displays 370 and/or audio systems 372 of the AHU 360.

The computer-readable medium 325 can include any known form of computer-usable or computer-readable medium. The computer-readable (storage) medium 325 can be any type of memory technology including any types of read-only memory or random access memory or any combination thereof. This encompasses a wide variety of media that include, for example but not limited to, an electronic, magnetic, optical, electromagnetic, infrared, or semiconductor system, apparatus, device, or propagation medium. Some non-limiting examples can include, for example, volatile media, non-volatile media, removable media, and non-removable media. The term computer-readable medium and variants thereof, as used in the specification and claims, refer to any known computer storage media. In some embodiments, storage media includes volatile and/or non-volatile, removable, and/or non-removable media. For example, storage media could include any of random-access memory (RAM), read-only memory (ROM), electrically erasable programmable read-only memory (EEPROM), solid state memory or other memory technology, CD ROM, DVD, other optical disk storage, magnetic tape, magnetic disk storage or other magnetic storage devices, and any other medium that can be used to store desired data. For sake of simplicity of illustration, the computer-readable medium 325 is illustrated as a single block within computer 315; however, the computer-readable storage medium 325 can be distributed throughout the vehicle including in any of the various blocks illustrated in FIG. 3, and can be implemented using any combination of fixed and/or removable storage devices depending on the implementation.

The computer-readable storage medium 325 stores instructions 328 that, when executed by the processor, cause the processor 320 to perform various acts as described herein. The instructions 328 may be stored in the medium 325 in one or more modules. For instance, the instructions 329 include a MirrorLink client application module 329 that can be loaded and executed at processor 320 as will be described in further detail below. The instructions 328 may be embodied in the form of one or more programs or applications (not shown in detail). While instructions 328 and the MirrorLink client application module 329 are shown generally as residing in the computer-readable storage medium 325, various data, including the instructions 328 are in some embodiments stored in a common portion of the storage medium, in various portions of the storage medium 325, and/or in other storage media. The instructions can then be loaded at the processor 320 and executed.

The NAD 230 includes at least one antenna 335 that allows it to communicate with communication infrastructure 280 as described above with reference to FIG. 2. The NAD 230 can be communicatively coupled to various components of an onboard computer system 310 via a wireless or wired connection including via bus 305. The bus 305 can include any internal vehicle bus and includes various wired paths that are used to interconnect the various systems and route information between and among the illustrated blocks of FIG. 3. For sake of brevity, the description of that communication will not be repeated here.

The NAD 230 includes one or more wireless communication interfaces that facilitate communications to and from the system 310. While the NAD 230 is illustrated in a single box, it will be appreciated that this box can represent multiple different wireless communication interfaces each of which can include multiple ICs for implementation of the receivers, transmitters, and/or transceivers that are used for receiving and sending signals of various types, including relatively short-range communications or longer-range communications, such as signals for a cellular communications network. The NAD 230 is illustrated as being part of the onboard computer system 310, but can be implemented via one or more separate chipsets.

The NAD 230 includes at least one receiver and at least one transmitter that are operatively coupled to at least one processor such as processor 320. The NAD 230 can enable the vehicle to establish and maintain one or more wireless communications links (e.g., via cellular communications, WLAN, Bluetooth, and the like). The NAD 230 can perform signal processing (e.g., digitizing, data encoding, modulation, etc.) as is known in the art. The NAD 230 can use communication techniques that are implemented using multiple access communication methods including frequency division multiple access (FDMA), time division multiple access (TDMA), code division multiple access (CDMA), orthogonal frequency division multiple access (OFDMA) in a manner to permit simultaneous communication with and between communication infrastructure 280 (of FIG. 2).

The NAD 230 can be used to exchange information over wide area networks 285, such as the Internet. This information can include display information, audio information, video data, voice data, e-mail and any other media, etc.).

Depending on the implementation, the NAD 230 can include any number of short range transceivers and long range transceivers depending on the particular implementation. The NAD 230 can include wireless communication interfaces for relatively short-range communications that employ one or more short-range communication protocols, such as a dedicated short range communication (DSRC) system (e.g., that complies with IEEE 802.11p), a WiFi system (e.g., that complies with IEEE 802.11a, b, g, IEEE 802.16, WI-FI®) BLUETOOTH®, infrared, IRDA, NFC, the like, or improvements thereof). In one embodiment, at least one communication interface of the NAD 230 is configured as part of a short-range vehicle communication system, and allows the vehicle 302 to directly communicate (transmit and receive) information with other nearby vehicles (not illustrated). Likewise, the NAD 230 can include wireless communication interfaces for longer-range communications such as cellular and satellite based communications that employ any known communications protocols. In one embodiment, one of the wireless communication interfaces of the NAD 230 is configured to communicate over a cellular network, such as a third generation (3G) or fourth generation (4G) cellular communication network. Thus, the wireless communication interfaces that are included within the NAD 230 can be implemented using any known wireless communications technologies including any of those described above.

The AHU 260 is used to provide passengers in the vehicle with information and/or entertainment in various forms including, for example, music, news, reports, navigation, weather, and the like, received by way of radio systems 374, Internet radio, podcast, compact disc, digital video disc, other portable storage device, video on demand, and the like.

In the example implementation illustrated in FIG. 3, the AHU 260 includes various infotainment system components including, but not limited to, ports 365 (e.g., USB ports), one or more Bluetooth interface(s) 366, input/output devices 368, one or more display(s) 370, one or more audio system(s) 372, one or more radio systems 374, and a navigation system 376. In one embodiment, the input/output devices 368, display(s) 370, and audio system(s) 372 can collectively provide a human machine interface (HMI) inside the vehicle.

The ports 365 and Bluetooth interface 366 allow for external computing devices to connect to the onboard computer system 310 and the AHU 260.

The input/output devices 368 can be any device(s) adapted to provide or capture user inputs to or from the onboard computer 310. For example, a button, a keyboard, a keypad, a mouse, a trackball, a speech recognition unit, any known touchscreen technologies, and/or any known voice recognition technologies, monitors or displays 370, warning lights, graphics/text displays, speakers, etc. could be utilized to input or output information in the vehicle 302. Thus, although shown in one block for sake of simplicity, the input/output devices 368 can be implemented as separate output devices 368 and separate input devices 368 in some implementations.

As one example, the input/output devices 368 can be implemented via a display screen with an integrated touch screen, and/or a speech recognition unit, that is integrated into the system 360 via a microphone that is part of the audio systems 372.

Further, it is noted that the input/output devices 368 (that are not illustrated) can include any of a touch-sensitive or other visual display, a keypad, buttons, or the like, a speaker, microphone, or the like, operatively connected to the processor 320. The input can be provided in ways including by audio input. Thus, for instance, the sub-system or onboard computer system 310 in some embodiments includes components allowing speech-to-data, such as speech-to-text, or data-to-speech, such as text-to-speech conversions. In another case, the user inputs selected information to a personal device of the user, such as a personal or tablet computer or a smart phone, which in turn communicates the information to the onboard computer system by wireless or wired communication.

The displays 370 can include any types and number of displays within the vehicle. For example, the displays 370 can include a visual display screen such as a navigation display screen or a heads-up-display projected on the windshield or other display system for providing information to the vehicle operator. One type of display may be a display made from organic light emitting diodes (OLEDs). Such a display can be sandwiched between the layers of glass (that make up the windshield) and does not require a projection system. The displays 370 can include multiple displays for a single occupant or for multiple occupants, e.g., directed toward multiple seating positions in the vehicle.

Any type of information can be displayed on the displays 370 including information that is generated by the application server 290 of FIG. 2.

The navigation systems 376 can include a global positioning system (GPS) device for establishing a global position of the vehicle. The GPS device includes a processor and one or more GPS receivers that receive GPS radio signals via antenna 377. These GPS receivers receive differential correction signals from one or more base stations either directly or via a geocentric stationary or LEO satellite, an earth-based station or other means. This communication may include such information as the precise location of a vehicle, the latest received signals from the GPS satellites in view, other road condition information, emergency signals, hazard warnings, vehicle velocity and intended path, and any other information. The navigation systems 376 can also regularly receive information such as updates to the digital maps, weather information, road condition information, hazard information, congestion information, temporary signs and warnings, etc. from a server 290. The navigation systems 376 can include a map database subsystem (not illustrated) that includes fundamental map data or information such as road edges, the locations of stop signs, stoplights, lane markers etc. that can be regularly updated information with information from a server such as server 290.

The navigation systems 376 can receive information from various sensors (not illustrated) as is known in the art. For example, in one implementation, the sensors can include an inertial navigation system (INS) (also referred to as an inertial reference unit (IRU)) that includes one or more accelerometers (e.g., piezoelectric-based accelerometers, MEMS-based accelerometers, etc.), and one or more gyroscopes (e.g., MEMS-based gyroscopes, fiber optic gyroscopes (FOG), accelerometer-based gyroscopes, etc.). For instance, three accelerometers can be implemented to provide the vehicle acceleration in the latitude, longitude and vertical directions and three gyroscopes can be employed to provide the angular rate about the pitch, yaw and roll axes. In general, a gyroscope would measure the angular rate or angular velocity, and angular acceleration may be obtained by differentiating the angular rate.

The navigation systems 376 can be implemented using any component or combination of components capable of determining a direction of travel of the vehicle 302.

In one embodiment, in response to a trigger event (e.g., detecting that a communication session has been started or established with the application server 290), the MirrorLink client application module 329 can be loaded and executed at the processor 320 of the vehicle 302 to allow for information provided from applications (e.g., smartphone applications) running at the application server 290 (FIG. 2) to be provided to the MirrorLink client application module 329 and then distributed to various components of AHU 260. This information can then be presented via a human machine interface (HMI) inside the vehicle 302 (e.g., displayed on a display or played back via audio systems). For instance, in one implementation, the human machine interface in each vehicle can be a display 370 or an audio system 372 located inside the cabin of the vehicle 302, such as a display and/or audio system that is part of an infotainment system.

Figure 4:
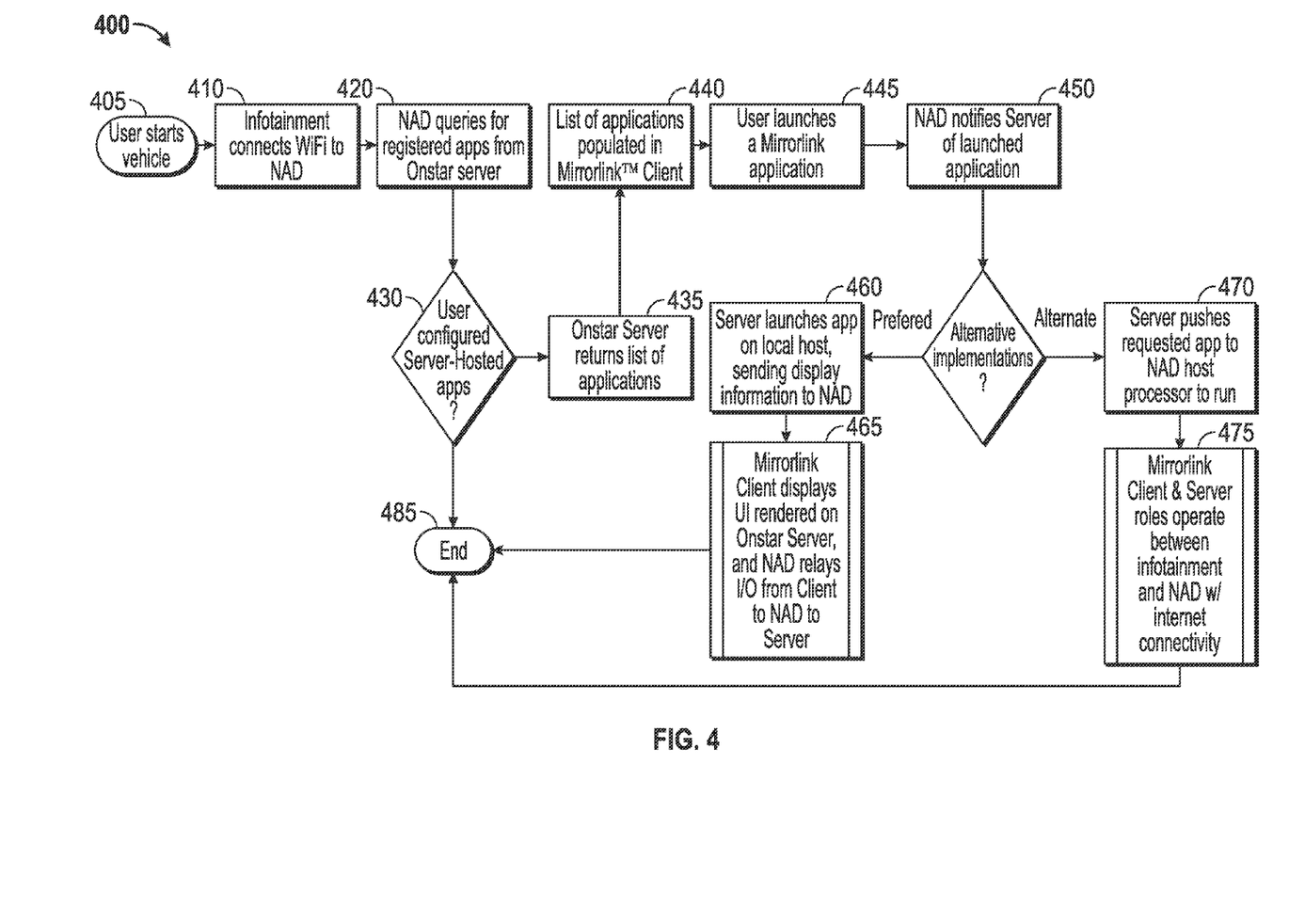
FIG. 4 is a flow chart of a method that describes operation of the systems of FIG. 2 and/or FIG. 3 in accordance with some of the disclosed embodiments.

FIG. 4 is a flow chart of a method 400 that describes operation of the systems of FIGS. 2 and 3 in accordance with some of the disclosed embodiments. FIG. 4 will be described below with reference to FIGS. 2 and 3. It should be understood that steps of the method 400 are not necessarily presented in any particular order and that performance of some or all the steps in an alternative order is possible and is contemplated. The steps have been presented in the demonstrated order for ease of description and illustration. Further, steps can be added, omitted, and/or performed simultaneously without departing from the scope of the appended claims. It should also be understood that the illustrated method 400 can be ended at any time. In certain embodiments, some or all steps of this process, and/or substantially equivalent steps, are performed by execution of computer-readable instructions stored or included on a computer-readable medium, for example. For instance, references to a processor performing functions of the present disclosure refer to any one or more interworking computing components executing instructions, such as in the form of an algorithm, provided on a computer-readable medium, such as a memory associated with processors of the onboard computer system 310 and the remote server 390.

The method 400 begins at 405 when the user starts the vehicle 202, and at 410 the AHU 260 establishes a communication link to the NAD 230. This communication link can be over a bus 205/305, via an Ethernet cable, a WLAN communication link, a Bluetooth communication link, etc. At 420, the network access device 230 can submit a request to the application server 290 for a list of registered applications. At 430, the application server 290 will determine whether the AHU 260 has registered for or has access to any applications that are maintained or hosted at the application server 290.

When the application server 290 determines that the AHU 260 has not registered for or does not have access to any applications that are hosted at the application server 290, the method 400 ends at 485. By contrast, when the application server 290 determines that the AHU 260 has registered for or has access to one or more applications that are hosted at the application server 290, the method 400 proceeds to 435, where the application server 290 communicates a list of those applications to the AHU 260 (via the NAD 230), and at 440 this list of applications can be provided to the MirrorLink client application 329.

When an occupant or user of the vehicle 302 activates the MirrorLink client application 329 at 445, the list of applications can be displayed on one of the displays 370 of the AHU 260, and the occupant or user can select/request one or more of the applications from the list that they wish to use (e.g., by pushing a button or selecting an icon presented on a display 370 within the vehicle 302). This causes the processor 230, which is running the MirrorLink client application 329, to communicate a message to the NAD 230 to indicate which particular application(s) (from the list) has/have been selected/requested. The method 400 then proceeds to 450.

At 450, the NAD 230 communicates a message to the application server 290 to indicate which particular application(s) (from the list) has/have been selected/requested by the user. At this point, the application server 290 knows which particular application(s) has/have been selected/requested. The method 400 can then proceed in one of two ways depending on the implementation. In some implementations, the method 400 proceeds along a first path indicated via blocks 460 and 465, whereas in other implementations, method 400 proceeds along a second path indicated via blocks 470 and 475.

When the method 400 proceeds along the first path, at 460, the application server 290 locally launches the particular application(s) that has/have been selected/requested, and communicates information associated with those particular application(s) to the NAD 230. At 465, the NAD 230 can then provide this information to the processor 230, which is running the MirrorLink client application 329. The MirrorLink client application 329 can then process the information and provide it to the AHU 260 where it can be presented to occupants via any of the human machine interfaces described above. In addition, at 465, any input information that is input at the AHU 260 can then be communicated to the processor 230, which is running the MirrorLink client application 329. The MirrorLink client application 329 can then process that input information and provide it to the NAD 230 so that the input information can be communicated back to the particular application(s) that has/have been selected/requested and that are running at the application server 290. The method 400 then eventually ends at 485.

When the method 400 proceeds along the second path, at 470, the application server 290 pushes the particular application(s) that has/have been selected/requested to a host processor that is running at the NAD 230. In this embodiment, the MirrorLink server is essentially implemented entirely within the NAD 230, and the particular application(s) that has/have been selected/requested are installed and executed/run only for the particular time that . . . . In this embodiment, the host processor that is running at the NAD 230 executes the particular application(s) that has/have been selected/requested to generate information associated with that/those particular application(s), which can then be communicated to the processor 230 of the AHU 260 that is running the MirrorLink client application 329. The MirrorLink client application 329 can then process the information and provide it to the AHU 260 where it can be presented to occupants via any of the human machine interfaces described above. In addition, at 475, the input information that is input at the AHU 260 can then be communicated to the processor 230, which is running the MirrorLink client application 329. The MirrorLink client application 329 can then process that input information and provide it to the NAD 230 so that the input information can be communicated back to the particular application(s) that has/have been selected/requested and that are running at the host processor of the NAD 230. The method 400 then eventually ends at 485.

The description above has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In some instances, well-known components, systems, or methods have not been described in detail in order to avoid obscuring the present disclosure. Therefore, specific operational and functional details disclosed herein are not to be interpreted as limiting, but merely as a basis for the claims and as a representative basis for teaching one skilled in the art.

Those of skill in the art would further appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the description above includes a general context of computer-executable instructions, the present disclosure can also be implemented in combination with other program modules and/or as a combination of hardware and software. The terms "application," "algorithm," "program," "instructions," or variants thereof, are used expansively herein to include routines, program modules, programs, components, data structures, algorithms, and the like, as commonly used. These structures can be implemented on various system configurations, including single-processor or multiprocessor systems, microprocessor-based electronics, combinations thereof, and the like. Although various algorithms, instructions, etc. are separately identified herein, various such structures may be separated or combined in various combinations across the various computing platforms described herein.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

The above-described embodiments are merely exemplary illustrations of implementations set forth for a clear understanding of the principles of the disclosure. The foregoing detailed description will provide those skilled in the art with a convenient road map for implementing the exemplary embodiment or exemplary embodiments. While exemplary embodiments have been presented in the foregoing detailed description, it should be appreciated that a vast number of variations exist.

The exemplary embodiments are only examples, and are not intended to limit the scope, applicability, or configuration of the disclosure in any way. Variations, modifications, and combinations may be made to the above-described embodiments without departing from the scope of the claims. For example, various changes can be made in the function and arrangement of elements without departing from the scope of the disclosure as set forth in the appended claims and the legal equivalents thereof. All such variations, modifications, and combinations are included herein by the scope of this disclosure and the following claims.

What is claimed is:

1. A communication system, comprising:
an application server configured to host an application that when executed generates information, wherein the application server provides a first part of a server for serving the information generated by the application hosted at the application server, wherein the first part of the server is compliant with a MIRRORLINK 1.0 device specification;
a network coupled to the application server via a first network link;
communication infrastructure that is coupled to the network via a second network link, wherein the information is communicated from the application server over the network to the communication infrastructure;
a vehicle, comprising:
a network access device (NAD) integrated within the vehicle that comprises: a wireless communication interface configured to receive the information directly from the communication infrastructure via a wireless communication link, wherein the NAD provides a second part of the server for serving the information generated by the application hosted at the application server, wherein the second part of the server is compliant with the MIRRORLINK 1.0 device specification, wherein the NAD comprises:
a first processor; and
a first non-transitory computer-readable storage medium configured to store a protocol adapter module; and
an automotive head unit (AHU), communicatively coupled to the NAD, the AHU comprising:
a second non-transitory computer-readable storage medium configured to store a client application that is compliant with the MIRRORLINK 1.0 device specification, wherein the first processor is configured to load and execute the protocol adapter module to process the information before providing the information to the client application;
a second processor configured to load and execute the client application, wherein the protocol adapter module interfaces with the client application and provides the information to the client application after processing the information; and
a human-machine-interface (HMI) configured to receive the information from the client application and to present the information within the vehicle.

2. A communication system according to claim 1,
wherein the client application is configured to generate an indication that the application has been selected at the AHU; and
wherein the application server is configured to execute the application and generate the information in response to an indication that the application has been selected at the AHU.

3. A communication system according to claim 1, wherein the application server comprises:
computer hardware for implementing a virtual machine that is configured to execute the application to generate the information.

4. A communication system according to claim 1, wherein the application hosted at the application server is normally hosted at and designed to be executed by a consumer electronics device to generate the information, wherein the information is normally presented at the consumer electronics device and is capable of being replicated at the HMI of the AHU.

5. A communication system according to claim 4, wherein the consumer electronics device is a smartphone.

6. A communication system according to claim 1, wherein the information comprises any information generated by the application that is capable of being communicated to the NAD and then presented in the vehicle via the HMI.

7. A communication system according to claim 1, wherein the information comprises at least one of:
text or other messaging information, information from a website, entertainment information, telematics information, alert information, information from location-based services, and navigation data.

8. A communication system according to claim 1, wherein the communication infrastructure is either:
a cellular base station;
a wireless local area network (WLAN) access point; or
any other type of access point for the NAD that allows the wireless communication interface to communicate over the wireless communication link with the application server via the network.

9. A computer-implemented method for providing information generated by an application for presentation at a human-machine-interface (HMI) of an automotive head unit (AHU) of a vehicle, the computer-implemented method comprising:
loading, at a first processor of the AHU, a client application from a first non-transitory computer-readable storage medium, wherein the client application is compliant with the MIRRORLINK 1.0 device specification;
executing, at an application server, an application to generate information, wherein the application server provides a first part of a server for serving the information generated by the application hosted at the application server, wherein the first part of the server is compliant with a MIRRORLINK 1.0 device specification;
communicating the information from the application server over a network to communication infrastructure;
communicating the information from the communication infrastructure via a wireless communication link directly to a wireless communication interface of a network access device (NAD) that is integrated within a vehicle, wherein the NAD provides a second part of the server for serving the information generated by the application hosted at the application server, wherein the second part of the server is compliant with the MIRRORLINK 1.0 device specification, and wherein the NAD comprises: a second processor; and a second non-transitory computer-readable storage medium configured to store a protocol adapter module; loading, at the second processor of the NAD from a second non-transitory computer-readable storage medium, a protocol adapter module that interfaces with the client application;
executing the protocol adapter module at the processor to process the information, and after processing the information, communicating the information from the protocol adapter module of the NAD to the client application executing at the AHU of the vehicle; and
presenting the information received from the client application at the HMI of the AHU.

10. A computer-implemented method according to claim 9, further comprising:
- at the first processor: executing the client application, and communicating a request to the application server for access to the application by the AHU; and
- confirming, at the application server in response to receiving the request, whether the AHU of the vehicle is authorized to access the application;
- after confirming that the AHU of the vehicle is authorized to access the application: communicating an indication from the application server to the AHU that the AHU is authorized to access at least the application;
- at the AHU: selecting the application and communicating an indication to the application server that the application has been selected at the AHU;
- wherein the step of executing, at the application server, the application to generate the information, comprises:
- in response to receiving the indication at the application server: executing, at the application server, the application to generate the information that is to be provided to the AHU of the vehicle.

11. A computer-implemented method according to claim 10, further comprising:
- processing the information at the client application; and providing the processed information to the HMI, and
- wherein the step of presenting, comprises:
- presenting the processed information at the HMI of the AHU.

12. A computer-implemented method according to claim 9, wherein the application hosted at the application server is normally hosted at and designed to be executed by a consumer electronics device to generate the information, wherein the information is normally presented at the consumer electronics device and is capable of being replicated at the HMI of the AHU.

13. A computer-implemented method according to claim 12, wherein the consumer electronics device is a smartphone.

14. A computer-implemented method according to claim 9, wherein the information comprises at least one of:
- text or other messaging information, information from a website, entertainment information, telematics information, alert information, information from location-based services, and navigation data.

15. A vehicle configured to communicate with an application server that hosts and executes an application to generate information, wherein the application hosted at the application server is normally hosted at and designed to be executed by a consumer electronics device to generate the information, wherein the information is normally presented at the consumer electronics device, wherein the application server serves as a first part of a server for serving the information generated by the application hosted at the application server, wherein the first part of the server is compliant with a MIRRORLINK 1.0 device specification, the vehicle comprising:
- a network access device (NAD) integrated within the vehicle that comprises: a wireless communication interface that is configured to receive the information generated by the application server directly from communication infrastructure over a wireless communication link, wherein the NAD provides a second part of the server for serving the information generated by the application hosted at the application server, wherein the second part of the server is compliant with the MIRRORLINK 1.0 device specification, and wherein the NAD comprises:
  - a first processor; and
  - a first non-transitory computer-readable storage medium configured to store a protocol adapter module; and
- an automotive head unit (AHU), communicatively coupled to the NAD, the AHU comprising:
  - a second non-transitory computer-readable storage medium configured to store a client application that is compliant with the MIRRORLINK 1.0 device specification, wherein the first processor is configured to load and execute the protocol adapter module to process the information before providing the information to the client application;
  - a second processor configured to load and execute the client application, wherein the protocol adapter module interfaces with the client application and provides the information to the client application after processing the information; and
  - a human-machine-interface (HMI) configured to receive the information from the client application and to present the information generated by the application server.

* * * * *